United States Patent [19]

Gerbe et al.

[11] Patent Number: 5,243,450
[45] Date of Patent: Sep. 7, 1993

[54] OPTICAL MIXER FOR HELMET VISUAL DISPLAY SYSTEM

[75] Inventors: Jean-Pierre Gerbe, Pessac; Jean-Noël Perbet, Eysines, both of France

[73] Assignee: Sextant Avionique, Meudon La Foret, France

[21] Appl. No.: 873,203

[22] Filed: Apr. 24, 1992

[30] Foreign Application Priority Data

Apr. 25, 1991 [FR]  France ................. 91 05108

[51] Int. Cl.⁵ ........................ G02B 5/32; G02B 27/10
[52] U.S. Cl. ........................ 359/13; 359/15;
                                    359/630; 359/632
[58] Field of Search ............. 359/13, 14, 15, 409,
                                    359/583, 630, 632

[56] References Cited

U.S. PATENT DOCUMENTS

| | | | |
|---|---|---|---|
| 2,937,559 | 5/1960 | Shute et al. | 359/632 |
| 3,415,951 | 12/1968 | Heller | 359/632 |
| 3,620,601 | 11/1971 | Waghorn et al. | 359/632 |
| 4,309,070 | 1/1982 | St. Leger Searle | 359/15 |
| 4,364,636 | 12/1982 | Ellis | 359/632 |
| 4,468,101 | 8/1984 | Ellis | 359/409 |
| 4,582,389 | 4/1986 | Wood et al. | 359/15 |
| 4,874,214 | 10/1989 | Cheysson et al. | 359/15 |
| 5,124,821 | 6/1992 | Antier et al. | 359/14 |

FOREIGN PATENT DOCUMENTS

| | | |
|---|---|---|
| 0201306 | 12/1986 | European Pat. Off. |
| 0206324 | 12/1986 | European Pat. Off. |
| 0252200 | 1/1988 | European Pat. Off. ........ 359/15 |
| 0403342 | 12/1990 | European Pat. Off. |
| 2665267 | 1/1992 | France. |
| 2084347 | 4/1982 | United Kingdom. |
| 2145242 | 3/1985 | United Kingdom ........ 359/632 |

*Primary Examiner*—Martin Lerner
*Attorney, Agent, or Firm*—Oblon, Spivak, McClelland, Maier & Neustadt

[57] ABSTRACT

An optical mixer for use in a helmet visual display system including a light intensifier tube for night vision and a cathode-ray tube for the display of a synthetic image. The mixer includes a swinging glass plate with a spectrally reflective and angularly selective coating. When the angle of the swinging glass plate is changed, the amount of light transmitted through the mixer is changed.

6 Claims, 2 Drawing Sheets

OPTICAL MIXER FOR HELMET VISUAL DISPLAY SYSTEM

BACKGROUND OF THE INVENTION

1. Field of the Invention

The present invention relates to an optical mixer for helmet visual display systems.

Helmet display systems are generally used in military aircraft or helicopters. Among the different types of display systems of this type, there are those fitted out with two image sources: a cathode-ray tube and a light intensifier tube (for night vision). The cathode-ray tube is used by day and by night to present a synthetic image (comprising piloting, navigation and firing information). The image intensifier tube is used only by night to enable viewing of the outside scene at night without illumination. The images from the two sources are presented to the pilot's eyes by means of an optical collimation system common to both channels. This calls for a mixer in the optical path in order to enable the superimposition of the images of these two sources. This mixer is generally a semi-reflective mirror.

2. Description of the Prior Art

To work properly, this display system must meet the following constraints as regards the proportions of light reflected and light transmitted by the mixer. The light intensifier tube gives a luminance of some $Cd/m^2$. The luminance of the image given by the light intensifier and considered at the pilot's eyes should also be equal to some $Cd/m^2$. The latter luminance is directly related to the coefficient of reflexion of the mixer. This coefficient should therefore be the maximum. The cathode-ray tube may give a luminance of several thousands of $Cd/m^2$. By night, the image of this cathode-ray tube should have a luminance of some $Cd/m^2$. The coefficient of transmission of the mixer may therefore be very low in this case. Thus, by night, the typical characteristics of the mixer are:

reflection : 90% for the light intensifier, and
transmission: 10% for the cathode-ray tube.

By day, the image of the cathode-ray tube should have a luminance of 1000 to 2000 $Cd/m^2$ to be visible on a very bright background. Consequently, the mixer defined for the night is no longer suited to daytime use for it excessively attenuates the light of the cathode-ray tube.

Because the spectral bands of the images emitted by the cathode-ray tubes are very close to those of the images emitted by the light intensifier tubes, it is not possible to resort to standard selective mixers, which are not sufficiently selective.

One known approach, according to the French patent application No. 90 09610, removes the mixer during daytime use, since the light intensifier channel is then not used by day. However the space taken up by the standard mechanisms used for removal and the weight of these mechanisms are non-negligible and incompatible with helmet visual display systems. Furthermore, the elimination of the mixer from the optical path would lead to a variation of the optical path. This would change the position of the images presented to the user and make it necessary to carry out an adjustment of this optical path or would lead to a lowering of the quality of the image.

SUMMARY OF THE INVENTION

An object of the invention is a mixer for a helmet display system of the above-mentioned type that enables changing from daytime vision to night vision in as simple a way as possible without requiring very precise controls, and is also light and compact.

The mixer according to the invention is spectrally selective and advantageously comprises a swinging or tilting glass plate with spectrally selective and reflective coating. According to an advantageous aspect of the invention, this coating may be obtained by thin film technology (vacuum deposition) or by holographic technology.

For reasons related to physics, this type of coating is also angularly selective. Advantageously, the glass plate swings about an axis passing through its center.

BRIEF DESCRIPTION OF THE DRAWING

The invention shall be understood more clearly from the following detailed description of several embodiments, taken as non-restrictive examples and illustrated by the appended drawings, of which.

DESCRIPTION OF A PREFERRED EMBODIMENT

Figure 1:
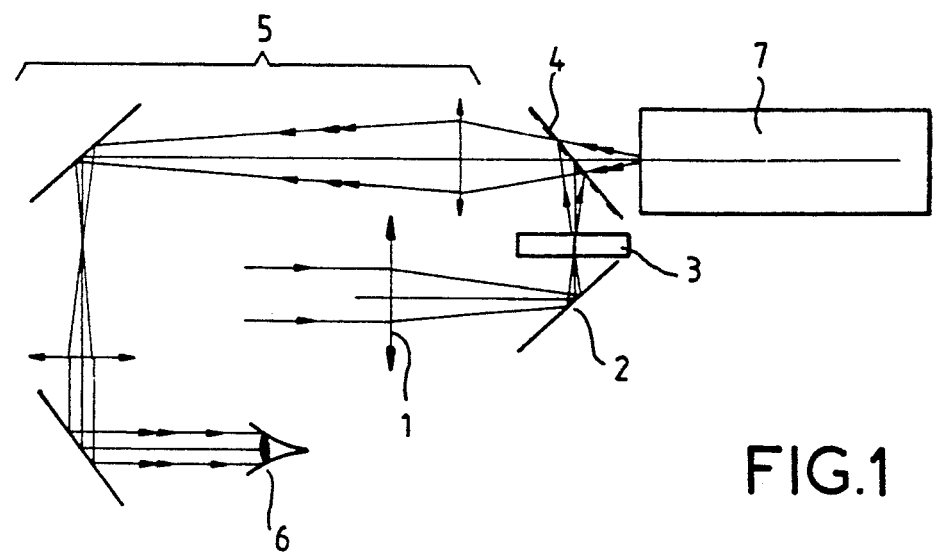
FIG. 1 is a an optical diagram showing the principle of a helmet visual display system according to the prior art.

The visual display system shown in FIG. 1 has an objective 1 receiving night-time images from the exterior and focusing them, through an onward-reflecting mirror 2, on a light intensifier tube 3. The output beam from the tube 3 is sent onwards by a mixer 4 (in reflection) and an optical collimation system 5 to the user's eye 6. The optical collimation system 5, in a well known way, comprises several objectives and onward-reflecting mirrors. Furthermore, the mixer 4, used in transmission, transmits the images formed by a cathode-ray tube 7.

As specified here above, the mixer 4, in order to be capable of usefully sending on the beam from the tube 3, achieves relatively little attenuation (about 10%) in reflection but achieves high attenuation in transmission. This raises no problems for the images of the cathode-ray tube 7 in night-time use, but ceases to be appropriate in day-time use when it should show almost no attenuation in transmission.

The mixer of the invention, which may be used instead of the known mixer 4, is constituted by a glass plate 8 comprising a spectrally reflective and angularly selective coating. This coating may be made by the deposition of optical thin layers and, preferably, a dichroic or holographic deposition. This type of treatment has a characteristic of highly selective spectral transmission that can be chosen as a function of the spectral band of the cathode-ray tube used. Furthermore, this type of treatment is angularly selective in reflection, i.e. for a certain small range of angles of incidence (for example an incidence of about 45° to ±5°), it is almost totally reflective (to about 95%) and outside this range it is almost totally transmitting.

Figure 2:
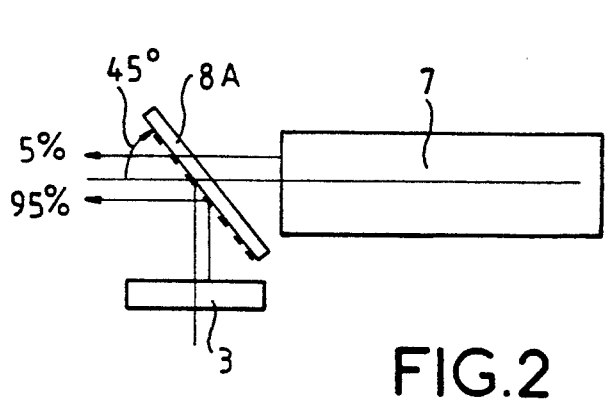
FIG. 2 is a simplified drawing showing the mixer of the invention in the "night" position.
Figure 3:
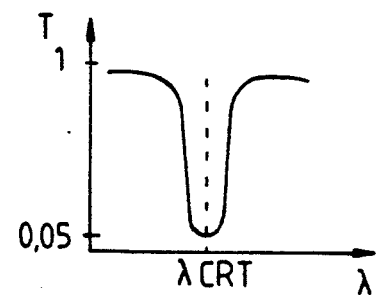
FIG. 3 is a graph of spectral transmission of the mixer of FIG. 2 (in the "night" position)

Thus, as shown in FIG. 2, in night-time use, the mixer is in the position 8A. For this position 8A, the angle of incidence of the beam coming from the tube 3 to the surface of the plate of the mixer is about 45°. This is also the case with the beam coming from the cathode-ray tube 7, which is perpendicular to the beam coming from the tube 3. The coating of the mixer (for a wavelength of 545 nm for example) then has the following characteristics: reflection 95% and transmission 5%. The spectral transmission curve (FIG. 3) of the mixer 8A has a dip (to 5%) for a narrow range of wavelengths centered on a wavelength practically equal to the wavelength of the light emitted by the cathode-ray tube 7. Outside this dip, the transmission is almost 100%.

Figure 4:
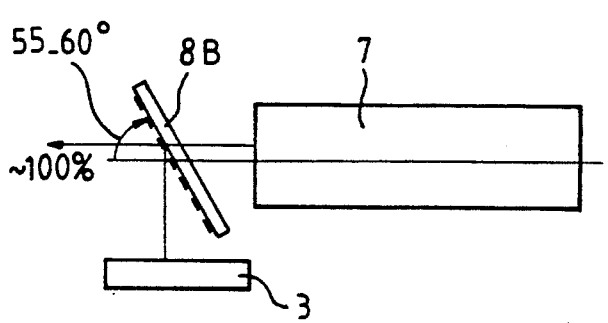
FIG. 4 is a simplified drawing showing the mixer of the invention in the "day" position.

In day-time use (FIG. 4), the mixer is in the position 8B. For this position 8B, the angle of incidence of the beam coming from the tube 3 (like that of the beam coming from the tube 7) to the surface of the plate of the mixer is about 55° to 60°. The coefficient of transmission of the mixer is then almost 100%. The dip in the spectral transmission curve (FIG. 5) of the mixer is then located beyond the wavelength of the light emitted by the cathode-ray tube. Consequently, it is enough to make the mixer swing by about 10° to 15 degrees in order to go from the "day" position to the "night" position and vice versa.

Figure 6:
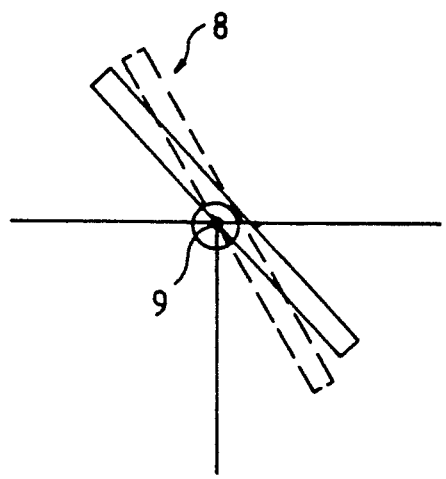
FIG. 6 is a simplified view showing the optimal position of the axis of rotation of the mixer of the invention.

To restrict the range of motion of the mixer as far as possible, it can be made to swing about an axis 9 (FIG. 6) passing through its center. The volume needed for the mixer is thus restricted.

If the glass plate on which the mixer is formed has a thickness of 2 mm for example, its rotation by an angle of 15° creates a shift of about 0.2 mm in the reflected or transmitted image. To prevent such a shift, the mixer must be placed in a zone where the image may be considered to be at infinity.

Figure 5:
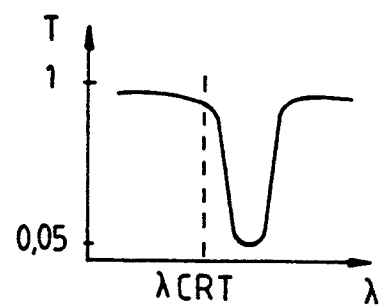
FIG. 5 is a graph of spectral transmission of the mixer of FIG. 4 (in the "day" position)

To achieve a condition such as this, optical collimation systems are interposed between the image source and the mixer as shown in FIG. 5. In this figure, the elements that are the same as those of the preceding figures are assigned the same numerical references.

Figure 7:
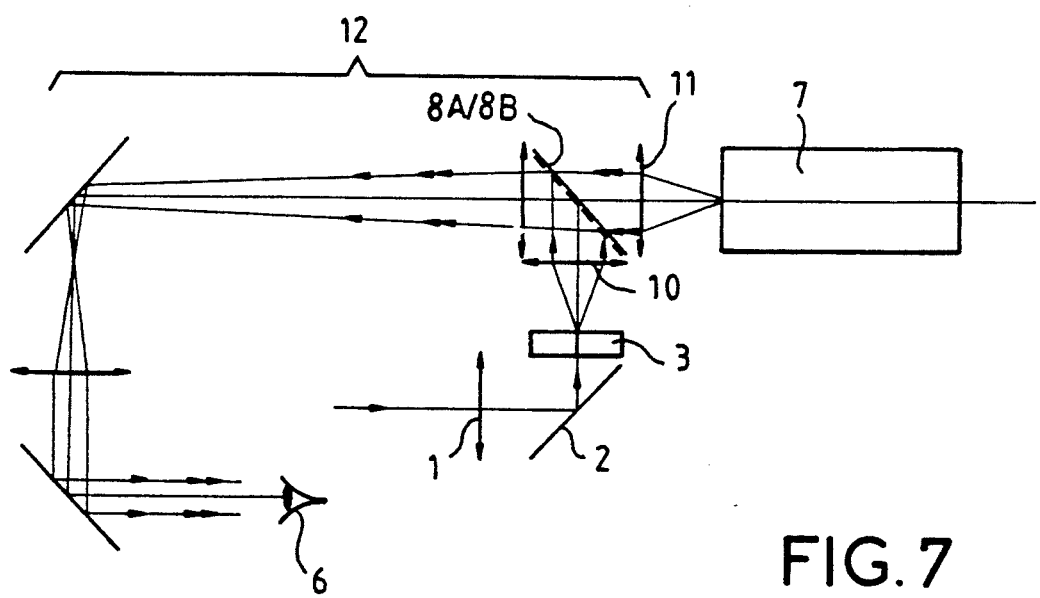
FIG. 7 is a optical diagram of the principle of an embodiment of the visual display system of the invention, enabling the elimination of the faults created by the motions of the mixer.

The additional optical collimation devices are respectively referenced 10 (the one interposed between the tube 3 and mixer 8) and 11 (the one interposed between the tube 7 and the mixer 8). The common optical collimation system 5, which was previously positioned downline with respect to the mixer, can now be considered to include the optical devices 10 and 11, and is referenced 12 in FIG. 7.

What is claimed is:

1. A visual display system for use in a helmet, comprising:
    a light intensifier tube for presenting a night vision image;
    a cathode-ray tube for presenting a synthetic image; and
    an optical mixer for mixing said night vision image and said synthetic image, including a pivoting optical plate with a spectrally reflective an angularly selective coating.

2. A visual display system according to claim 1, wherein the coating of the optical plate is made by the deposition of optical thin layers.

3. A visual display system according to claim 2, wherein the coating is a hologram.

4. A visual display system according to any of the claims 1, 2 and 3, wherein the optical plate pivots about an axis passing through a center portion of the optical plate.

5. A visual display system according to claim 1, wherein an optical collimation system is interposed between the mixer and the light intensifier and the cathode ray tubes.

6. A visual display system according to claim 1, wherein pivoting of the optical plate changes an angle of the angularly selective coating with respect to the cathode-ray tube, thereby changing a range of wavelengths from the cathode-ray tube allowed to pass through the angularly selective coating.

* * * * *